United States Patent
Li et al.

(10) Patent No.: US 11,611,376 B2
(45) Date of Patent: Mar. 21, 2023

(54) MEASUREMENT PERIOD FOR BEAM REPORTING

(71) Applicant: Apple Inc., Cupertino, CA (US)

(72) Inventors: Hua Li, Arlington, VA (US); Jie Cui, Santa Clara, CA (US); Yang Tang, San Jose, CA (US); Yushu Zhang, Beijing (CN); Manasa Raghavan, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/259,468

(22) PCT Filed: Aug. 9, 2019

(86) PCT No.: PCT/US2019/045951
§ 371 (c)(1),
(2) Date: Jan. 11, 2021

(87) PCT Pub. No.: WO2020/033860
PCT Pub. Date: Feb. 13, 2020

(65) Prior Publication Data
US 2021/0281295 A1    Sep. 9, 2021

Related U.S. Application Data

(60) Provisional application No. 62/717,708, filed on Aug. 10, 2018.

(51) Int. Cl.
*H04B 7/0408*    (2017.01)
*H04B 7/06*     (2006.01)
(Continued)

(52) U.S. Cl.
CPC ......... *H04B 7/0408* (2013.01); *H04B 7/0617* (2013.01); *H04B 7/0626* (2013.01); *H04W 72/042* (2013.01); *H04W 72/046* (2013.01)

(58) Field of Classification Search
CPC .. H04W 72/042; H04W 76/27; H04L 5/0053; H04L 1/1812; H04L 5/0055
(Continued)

(56) References Cited

U.S. PATENT DOCUMENTS

| | | | |
|---|---|---|---|
| 2012/0115463 A1* | 5/2012 | Weng | H04B 17/318 |
| | | | 455/425 |
| 2013/0039199 A1* | 2/2013 | Liao | H04B 7/024 |
| | | | 370/252 |

(Continued)

FOREIGN PATENT DOCUMENTS

WO    2018085601    5/2018

OTHER PUBLICATIONS

Nokia et al., "Joint L1-RSRP Beam Reporting for SSB and CSI-RS"; R1-1807193, 3GPP TSG RAN WG1 Meeting #93, May 11, 2018, pp. 1-3.
(Continued)

*Primary Examiner* — Sam K Ahn
*Assistant Examiner* — Gina M Mckie
(74) *Attorney, Agent, or Firm* — Kowert, Hood, Munyon, Rankin & Goetzel, P.C.

(57) ABSTRACT

In NR, a gNB utilizes multiple antennas and beam forming techniques for downlink transmissions to UEs. Described herein are methods and apparatus by which a UE measures the quality of multiple directional beams received from a gNB.

14 Claims, 2 Drawing Sheets

(51) Int. Cl.
  *H04W 72/04*   (2009.01)
  *H04W 72/044*  (2023.01)
(58) Field of Classification Search
  USPC .......................................................... 370/329
  See application file for complete search history.

(56) References Cited

U.S. PATENT DOCUMENTS

| | | | |
|---|---|---|---|
| 2018/0007577 A1 | 1/2018 | Guo et al. | |
| 2018/0083680 A1 | 3/2018 | Guo et al. | |
| 2018/0092129 A1* | 3/2018 | Guo .................. | H04W 56/0005 |
| 2018/0278314 A1* | 9/2018 | Nam .................. | H04W 72/042 |
| 2018/0316405 A1* | 11/2018 | Li ........................ | H04B 7/0626 |
| 2019/0149211 A1* | 5/2019 | Nilsson ................ | H04B 7/0695 |
| | | | 375/267 |

OTHER PUBLICATIONS

China Telecom, "Discussion on the RSRP calculation"; R1-1802446, 3GPP TSG RAN WG1 Meeting #92, Feb. 15, 2018, pp. 1-3.
International Search Report and Written Opinion for International Application No. PCT/US2019/045951, dated Dec. 3, 2019, pp. 1-10.

* cited by examiner

MEASUREMENT PERIOD FOR BEAM REPORTING

PRIORITY CLAIM

This application is a U.S. National Stage filing of International Application No. PCT/US2019/045951, filed Aug. 9, 2019, titled "Measurement Period for Beam Reporting", which claims priority to U.S. Provisional Application No. 62/717,708, filed Aug. 10, 2018. The aforementioned Applications are hereby incorporated by reference in their entireties.

TECHNICAL FIELD

Embodiments described herein relate generally to wireless networks and communications systems. Some embodiments relate to cellular communication networks including 3GPP (Third Generation Partnership Project) networks, 3GPP LTE (Long Term Evolution) networks, 3GPP LTE-A (LTE Advanced), and 3GPP fifth generation (5G) or new radio (NR) networks, although the scope of the embodiments is not limited in this respect.

BACKGROUND

In Long Term Evolution (LTE) and next generation new radio (NR) systems, a mobile terminal (referred to as a User Equipment or UE) connects to the cellular network via a base station (referred to as an evolved Node B or eNB or as a next generation Node B or gNB). In NR, a gNB utilizes multiple antennas and beam forming techniques for downlink transmissions to UEs. Described herein are methods and apparatus by which a UE measures the quality of multiple directional beams received from a gNB.

DETAILED DESCRIPTION

Figure 1:
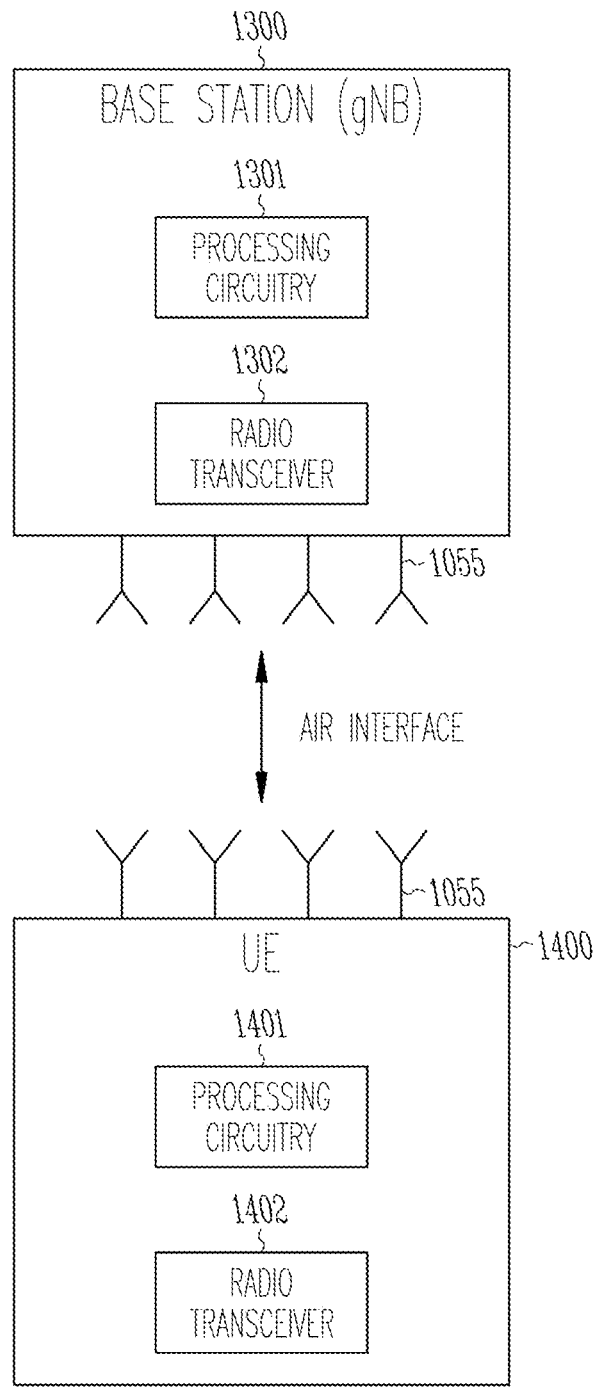
FIG. 1 illustrates an example UE and a base station (BS) such as an eNB or gNB according to some embodiments.

In Long Teen Evolution (LTE) and 5G systems, a mobile terminal (referred to as a User Equipment or UE) connects to the cellular network via a base station (BS), referred to as an evolved Node B or eNB in LTE systems and as a next generation evolved Node B or gNB in 5G or NR systems. FIG. 1 illustrates an example of the components of a UE 1400 and a base station (e.g., eNB or gNB) 1300. The BS 1300 includes processing circuitry 1301 connected to a radio transceiver 1302 for providing an air interface. The UE 1400 includes processing circuitry 1401 connected to a radio transceiver 1402 for providing an air interface over the wireless medium. Each of the transceivers in the devices is connected to antennas 1055. The antennas 1055 of the devices form antenna arrays whose directionality may be controlled by the processing circuitry. The memory and processing circuitries of the UE and/or BS may be configured to perform the functions and implement the schemes of the various embodiments described herein.

The NR waveform is based on orthogonal frequency division multiplexing (OFDM) with variable numerology (i.e., subcarrier spacing). The NR time-domain structure has a 10-ms radio frame divided into ten 1-ms subframes. A subframe is in turn divided into slots consisting of 14 OFDM symbols. The duration of a slot in milliseconds depends on the numerology.

The air interface for NR, also referred to as the radio interface or radio access network (RAN), has a layered protocol architecture where peer layers of the UE and gNB pass protocol data units (PDUs) between each other that are encapsulated service data units (SKUs) of the next higher layer. The topmost layer in the user plane is the Service Data Application Protocol (SDAP) which is responsible for mapping QoS (quality-of-service) bearers to radio bearers according to their quality-of-service requirements. The next lower layers are the packet data compression protocol (PDCP) that transmits and receives IP (internet protocol) packets and the Radio-Link Control (RLC) layer responsible for segmentation and retransmission handling.

The PDCP layer communicates with the radio link control (RLC) layer via radio bearers to which IP packets are mapped. At the medium access control (MAC) layer, the connection to the RLC layer above is through logical channels, and the connection to the physical layer below is through transport channels. The primary UL transport channel is the uplink shared channel (UL-SCH), and the primary DL transport channel is the downlink shared channel (DL-SCH). Another DL transport channel, the broadcast channel (BCH), is used by the gNB to broadcast system information. At the physical layer, the UL-SCH is associated with the physical uplink shared channel (PDSCH), the DL-SCH is associated with the physical downlink shared channel (PDSCH), and the BCH is associated with the physical broadcast channel (PBCH). The control plane protocol layers are the same as for the user plane except that the topmost layer of the control plane in the access stratum between the UE and gNB is the radio resource control (RRC) layer in place of the SDAP layer. The physical layer is referred to as layer 1 or L1. The MAC, RLC, and PDCP layers are referred to as layer 2 or L2. The RRC layer, as well as the non-access stratum (NAS) layer between the UE and the core network in the control plane and user applications in the user plane, are referred to layer 3 or L3.

In order to perform scheduling and other link adaptation functions, the gNB needs to know the downlink channel from the BS to the UE. LTE and NR provides reference signals that may be used by a UE to obtain downlink channel state information (CSI) for a transmitting cell, referred to as channel state information reference signals (CSI-RSs). The UE may then feedback the CSI thus obtained to the serving cell in the form of a CSI report. CSI-RS are transmitted using particular time-frequency resource element (REs) of an orthogonal frequency division multiple access (OFDMA) transmission scheme over the physical downlink shared channel (PDSCH) with a configurable periodicity and spanning the entire transmit band. Multiple sets of CSI-RSs may be transmitted by a cell with each set corresponding to a different antenna port. A UE may use the CSI-RSs to estimate the channel and produce a CSI report that is fed back to the serving cell either multiplexed with data over the PDSCH or via the physical uplink control channel (PUCCH). For periodic CSI reporting, the CSI report is encoded with a forward error correction (FEC) such as a polar code and sent over the Both NR and LTE provide for multi-antenna transmission and reception where multi-input multi-output (MIMO) precoding and MIMO decoding are performed in the digital domain at baseband. At mmWave frequencies (above 6 Ghz, referred to as FR2) used by NR, however, it is contemplated that the antenna processing will be carried out in the analog or hybrid digital-analog domain on a carrier basis. This means that downlink transmissions to different UEs located in different directions relative to the gNB must be separated in time. Likewise, in the case of analog-based receiver-side beam-forming, the receive beam can only focus in one direction at a time. Beam management refers to the establishment and retention of a suitable beam pair made up of a transmitter-side beam direction and a corresponding receiver-side beam direction that jointly provide good connectivity.

In NR implementations, beam management refers to a set of L1/L2 procedures to acquire and maintain a set of transmission/reception point (TRP), where a TRP may be a gNB, and/or UE beams that can be used for downlink (DL) and uplink (UL) transmission/reception. Beam management includes various operations or procedures, such as beam determination, beam management, beam reporting, and beam sweeping operations/procedures. Beam determination refers to TRP(s) or UE ability to select of its own transmission (Tx)/reception (Rx) beam(s). Beam measurement refers to TRP or UE ability to measure characteristics of received beamformed signals. Beam reporting refers the HE ability to report information of beamformed signal(s) based on beam measurement. Beam sweeping refers to operation(s) of covering a spatial area, with beams transmitted and/or received during a time interval in a predetermined manner.

Tx/Rx beam correspondence at a TRP holds if at least one of the following conditions are satisfied: TRP is able to determine a TRP Rx beam for the uplink reception based on UE's downlink measurement on TRP's one or more Tx beams; and TRP is able to determine a TRP Tx beam for the downlink transmission based on TRP's uplink measurement on TRP's one or more Rx beams. Tx/Rx beam correspondence at a UE holds if at least one of the following is satisfied: UE is able to determine a UE Tx beam for the uplink transmission based on UE's downlink measurement on UE's one or more Rx beams; UE is able to determine a UE Rx beam for the downlink reception based on TRP's indication based on uplink measurement on UE's one or more Tx beams; and Capability indication of UE beam correspondence related information to TRxP is supported.

In some implementations, DL beam management includes procedures P-1, P-2, and P-3. Procedure P-1 is used to enable HE measurement on different TRP Tx beams to support selection of TRP Tx beams/UE Rx beam(s). For beamforming at TRP, procedure P-1 typically includes a intra/inter-TRP Tx beam sweep from a set of different beams. For beamforming at the UE, procedure P-1 typically includes a UE Rx beam sweep from a set of different beams.

Procedure P-2 is used to enable HE measurement on different TRP Tx beams to possibly change inter/intra-TRP Tx beam(s). Procedure P-2 may be a special case of procedure P-1 wherein procedure P-2 is used for a possibly smaller set of beams for beam refinement than procedure P-1. Procedure P-3 is used to enable HE measurement on the same TRP Tx beam to change HE Rx beam in the case UE uses beamforming. Procedures P-1, P-2, and P-3 may be used for aperiodic beam reporting.

UE measurements based on RS for beam management (at least CSI-RS) is composed of K beams (where K is a total number of configured beams), and the UE reports measurement results of N selected Tx beams (where N may or may not be a fixed number). The procedure based on RS for mobility purpose is not precluded. Beam information that is to be reported includes measurement quantities for the N beam(s) and information indicating N DL Tx beam(s), if N<K. Other information or data may be included in or with the beam information. When a UE is configured with K'>1 non-zero power (NZP) CSI-RS resources, a. HE can report N' CSI-RS Resource Indicator (CRIB).

In some NR implementations, a UE can trigger a mechanism to recover from beam failure, which is referred to a "beam recovery", "beam failure recovery request procedure", and/or the like. A beam failure event may occur when the quality of beam pair link(s) of an associated control channel falls below a threshold, when a time-out of an associated timer occurs, or the like. The beam recovery mechanism is triggered when beam failure occurs. The network may explicitly configure the HE with resources for UL transmission of signals for recovery purposes. Configurations of resources are supported where the base station (e.g., a TRP, gNB, or the like) is listening from all or partial directions (e.g., a random access region). The UL transmission/resources to report beam failure can be located in the same time instance as a Physical Random Access Channel (PRACH) or resources orthogonal to PRACH resources, or at a time instance (configurable for a LITE) different from PRACH. Transmission of DL signal is supported for allowing the UE to monitor the beams for identifying new potential beams.

For beam failure recovery, a beam failure may be declared if one, multiple, or all serving PDCCH beams fail. The beam failure recovery request procedure is initiated when a beam failure is declared. For example, the beam failure recovery request procedure may be used for indicating to a serving gNB (or TRP) of a new SSB or CSI-RS when beam failure is detected on a serving SSB(s)/CSI-RS(s). A beam failure may be detected by the lower layers and indicated to a Media Access Control (MAC) entity of the LT.

In some implementations, beam management includes providing or not providing beam-related indications. When beam-related indication is provided, information pertaining to UE-side beamforming/receiving procedure used for CSI-RS-based measurement can be indicated through QCL to the UE. The same or different beams on the control channel and the corresponding data channel transmissions may be supported.

Downlink (DL) beam indications are based on a Transmission Configuration Indication (TCI) state(s). The TCI state(s) are indicated in a TCI list that is configured by radio resource control (RRC) and/or Media Access Control (MAC) Control Element (CE). In some implementations, a LIE can be configured up to M TCI-States by higher layer signaling to decode PDSCH according to a detected PDCCH with downlink control information (DCI) intended for the LIE and the given serving cell where M depends on the UE capability. Each configured TCI state includes one reference signal (RS) set TCI-RS-SetConfig. Each TCI-RS-SetConfig includes parameters for configuring quasi co-location relationship(s) between the RSs in the RS set and the demodulation reference signal (DM-RS) port group of the PDSCH. The RS set includes a reference to either one or two DL RSs and an associated quasi co-location type (QCL-Type) for each DL RS(s) configured by the higher layer parameter QCL-Type. For the case of two DL RSs, the QCL types shall not be the same, regardless of whether the references are to the same DL RS or different DL RSs. The quasi co-location types indicated to the HE are based on the higher layer parameter QCL-Type and take one or a combination of the following types: QCL-TypeA: {Doppler shift, Doppler spread, average delay, delay spread}; QCL-TypeB: {Doppler shift, Doppler spread}; QCL-TypeC: {average delay, Doppler shift}; QCL-TypeD: {Spatial. Rx parameter}.

The UE may receive a selection command (e.g., in a MAC CE), which is used to map up to 8 TCI states to the codepoints of the DCI field TCI-states. Until a UE receives higher layer configuration of TCI states and before reception of the activation command, the UE may assume that the antenna ports of one DM-RS port group of PDSCH of a serving cell are spatially quasi co-located with the SSB determined in the initial access procedure. When the number of TCI states in TCI-States is less than or equal to 8, the DCI field TCI-states directly indicates the TCI state.

A beam failure recovery request could be delivered over dedicated PRACH or Physical Uplink Control Channel (PUCCH) resources. For example, a UE can be configured, for a serving cell, with a set $\bar{q}_0$ of periodic CSI-RS resource configuration indexes by higher layer parameter Beam-Failure-Detection-RS-ResourceConfig and with a set $\bar{q}_1$ of CSI-RS resource configuration indexes and/or SS/PBCH block indexes by higher layer parameter Candidate-Beam-RS-List for radio link quality measurements on the serving cell. If there is no configuration, the beam failure detection could be based on CSI-RS or SSB, which is spatially Quasi Co-Located (QCLed) with the PDCCH Demodulation Reference Signal (DMRS). For example, if the UE is not provided with the higher layer parameter Beam-Failure-Detection-RS-ResourceConfig, the UE determines $\bar{q}_0$ to include SS/PBCH blocks and periodic CSI-RS configurations with same values for higher layer parameter TCI-StatesPDCCH as for control resource sets (CORESET) that the UE is configured for monitoring PDCCH.

The physical layer of a UE assesses the radio link quality according to a set $\bar{q}_0$ of resource configurations against a threshold $Q_{out,LR}$. The threshold $Q_{out,LR}$ corresponds to a default value of higher layer parameter RLM-IS-OOS-thresholdConjig and Beam-failure-candidate-beam-threshold, respectively. For the set $\bar{q}_0$, the UE assesses the radio link quality only according to periodic CSI-RS resource configurations or SS/PBCH blocks that are quasi co-located, with the DM-RS of PDCCH receptions DM-RS monitored by the UE. The UE applies the configured $Q_{in,LR}$ threshold for the periodic CSI-RS resource configurations. The UE applies the $Q_{out,LR}$ threshold for SS/PBCH blocks after scaling a SS/PBCH block transmission power with a value provided by higher layer parameter Pc_SS.

In some implementations, if a beam failure indication has been received by a MAC entity from lower layers, then the MAC entity starts a beam failure recovery timer (beamFailureRecoveryTimer) and initiates a Random Access procedure. If the beamFailureRecoveryTimer expires, then the MAC entity indicates a beam failure recovery request failure to upper layers. If a DL assignment or UL grant has been received (e.g., on a PDCCH addressed for a cell radio network temporary identifier (C-RNTI)), then the MAC entity may stop and reset beamFailureRecoveryTimer and consider the beam failure recovery request procedure to be successfully completed.

In embodiments, a UE (e.g., in RRC CONNECTED mode) measures one or multiple beams of a cell and the measurement results (power values) are averaged to derive the cell quality. The UE may be configured to consider a subset of the detected beams, such as the N best beams above an absolute threshold. Filtering takes place at two different levels include at the physical layer (PHY) to derive beam quality and then at the RRC level to derive cell quality from multiple beams. Cell quality from beam measurements may be derived in the same way for the serving cell(s) and for the non-serving cell(s). Measurement reports contain the measurement results of the X best beams if the UE is configured to do so by the gNB. For channel state estimation purposes, the UE may be configured to measure CSI-RS resources and estimate a downlink channel state based on the CSI-RS measurements. The UE feeds the estimated channel state back to the gNB to be used in link adaptation.

Figure 2:
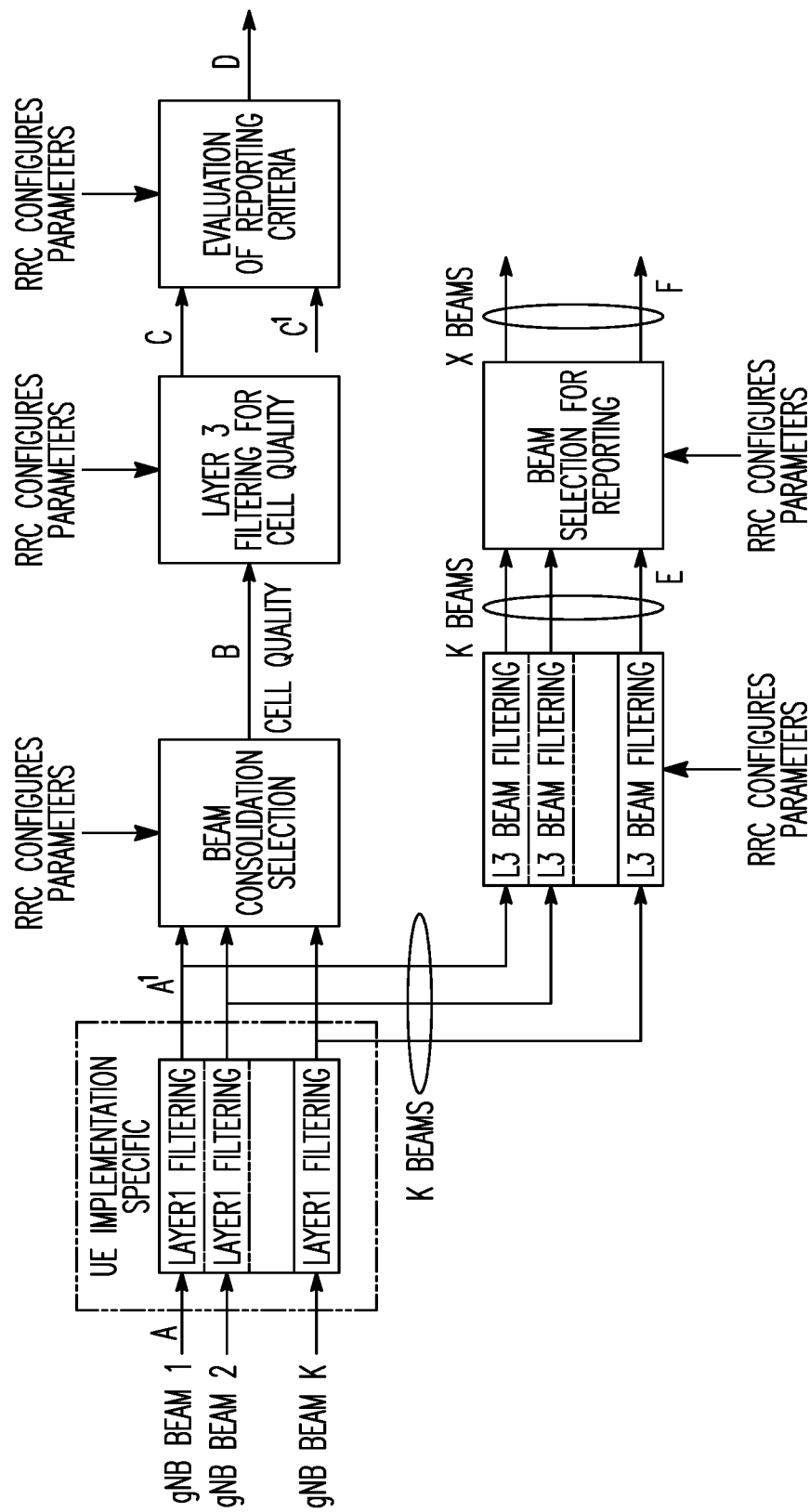
FIG. 2 illustrates an example measurement model for producing beam reports.

An example measurement model is shown by FIG. 2. In FIG. 2, point A includes measurements (e.g., beam specific samples) internal to the PHY. Layer 1 (L1) filtering includes internal layer 1 filtering circuitry for filtering the inputs measured at point A. The exact filtering mechanisms and how the measurements are actually executed at the PHY may be implementation specific. The measurements (e.g., beam specific measurements) are reported by the L1 filtering to layer 3 (L3) beam filtering circuitry and the beam consolidation/selection circuitry at point $A^1$.

The Beam Consolidation/Selection circuitry includes circuitry where beam specific measurements are consolidated to derive cell quality. For example, if N>1, else when N=1 the best beam measurement may be selected to derive cell quality. The configuration of the beam is provided by RRC signaling. A measurement (e.g., cell quality) derived from the beam-specific measurements are then be reported to L3 filtering for cell quality circuitry after beam consolidation/selection. In some embodiments, the reporting period at point B may be equal to one measurement period at point $A^1$.

The L3 filtering for cell quality circuitry is configured to filter the measurements provided at point B. The configuration of the Layer 3 filters is provided by the aforementioned RRC signaling or different/separate RRC signaling. In some embodiments, the filtering reporting period at point C may be equal to one measurement period at point B. A measurement after processing in the layer 3 filter circuitry is provided to the evaluation of reporting criteria circuitry at point C. In some embodiments, the reporting rate may be identical to the reporting rate at point B. This measurement input may be used for one or more evaluation of reporting criteria.

Evaluation of reporting criteria circuitry is configured to check whether actual measurement reporting is necessary at point D. The evaluation can be based on more than one flow of measurements at reference point C. In one example, the evaluation may involve a comparison between different measurements, such as a measurement provided at point C and another measurement provided at point $C^1$. In embodiments, the UE may evaluate the reporting criteria at least every time a new measurement result is reported at point C, $C^1$. The reporting criteria configuration is provided by the aforementioned RRC signaling (UE measurements) or different/separate RRC signaling. After the evaluation, measurement report information (e.g., as a message) is sent on the radio interface at point D.

Referring back to point $A^1$, measurements provided at point $A^1$ are provided to L3 Beam filtering circuitry, which is configured to perform beam filtering of the provided measurements (e.g., beam specific measurements). The configuration of the beam filters is provided by the aforementioned RRC signaling or different/separate RRC signaling. In embodiments, the filtering reporting period at point E may be equal to one measurement period at $A^1$. The K beams may correspond to the measurements on New Radio (NR)-synchronization signal (SS) block (SSB) or Channel State Information Reference Signal (CSI-RS) resources configured for L3 mobility by a gNB and detected by the UE at L1.

After processing in the beam filter measurement (e.g., beam-specific measurement), a measurement is provided to beam selection for reporting circuitry at point E. This measurement is used as an input for selecting the X measurements to be reported. In embodiments, the reporting rate may be identical to the reporting rate at point $A^1$. The beam selection for beam reporting circuitry is configured to select the X measurements from the measurements provided at point E. The configuration of this module is provided by the aforementioned RRC signaling or different/separate RRC signaling. The beam measurement information to be included in a measurement report is sent or scheduled for transmission on the radio interface at point F.

The measurement reports include a measurement identity of an associated measurement configuration that triggered the reporting. The measurement reports may also include cell and beam measurement quantities to be included in measurement reports that are configured by the network (e.g., using RRC signaling). The measurement reports may also include number of non-serving cells to be reported can be limited through configuration by the network. Cell(s) belonging to a blacklist configured by the network are not used in event evaluation and reporting. By contrast, when a whitelist is configured by the network, only the cells belonging to the whitelist are used in event evaluation and reporting. The beam measurements to be included in measurement reports are configured by the network, and such measurement reports include or indicate a beam identifier only, a measurement result, and beam identifier, or no beam reporting.

The current measurement period for beam reporting is not clear for NR systems. Embodiments herein provide a measurement period of periodic CSI-RS based L1-RSRP and aperiodic CSI-RS based L1-RSRP for beam reporting. According to various embodiments, for periodic CSI-RS based L1-RSRP, there are two options for a measurement period:

Option 1: No time domain averaging of L1-RSRP measurements are performed on HE side;
Option 2: L1 averaging with X samples are assumed.

For option 1, it is assumed that the UE will apply the beam reporting based on a single slot, and it is left to gNB to perform measurement averaging. However, there are some drawbacks for the report to be based on single slot. If there are multiple Tx beams, e.g. 16/32 beams, and UE is requested to report up to 4 beams, the HE will choose 4 beams just based on the single slot measurement. If the single slot measurement accuracy is not good enough, the correct beam may not be chosen. Simulation results based on single sample have demonstrated that the measurement accuracy is bad at some scenarios and the correct beam cannot be chosen.

Simulation results have shown that the measurement accuracy is dependent on the CSI-RS density, bandwidth, channel model and subcarrier spacing. For single sample, the measurement accuracy is not good even for SNR=0 dB on some cases. For example, the single sample accuracy may be larger than 2.5 dB for the ETU channel model, 24RB with D=⅓ in the ETU channel and 96RB with D=1 in the ETU channel model. L1-RSRP accuracy with ±2.5 dB can only guarantee that the reported beam can be within the best 5/8/12 beams out of a total of 8/16/32 beams, respectively, in 90% of cases respectively. The accuracy requirement will be even more stringent if better beam reporting quality is needed.

The reported beams will change for different report time and it is difficult for the gNB to average the measurement results. For some beams, there may be only one reporting result that cannot be averaged. If the gNB waits for some time to get the result of multiple beams, the delay may be large. Therefore, for the UE side, it is better to do some kind of averaging to help improve the reporting quality.

If the CSI-RS beam reporting interval and beam measurement period are identical, there will always be enough samples for averaging during the measurement period. However, if CSI-RS beam reporting interval is less than beam measurement period; there maybe not enough samples for averaging. A sliding window may be applied in those cases for sample averaging.

For aperiodic CSI-RS based L1-RSRP, if single sample measurement is applied, the UE may receive DCI at time n, and it will send out beam reporting at n+M, where M is the measurement delay for single sample. However, since single sample measurement would not provide enough accuracy, multiple samples averaging is needed. Suppose X samples are needed for averaging. The gNB can send out candidate Tx beams for X times after it sends out the DCI. The UE will send the beam reporting only when it finishes averaging the X samples. If the UE receives the DCI at time n, it will send out beam reports at where P is the measurement delay for multiple samples averaging. The report delay may be extended for the multiple samples averaging case compared with single sample case.

In Example 1, an apparatus for a user equipment (UE) comprises: memory and processing circuitry, wherein, the processing circuitry is to: measure reference signal received power (RSRP) of one or more channel state information reference signals (CSI-RSs), where the CSI-RSs are transmitted from a next generation evolved node B (gNB) via different directional beams; for a particular directional beam, average a plurality of RSRPs for the CSI-RS associated with that particular beam received at different times; and, encode a beam report for sending to the gNB that includes the average RSRP of one or more CSI-RSs associated with one or more beams.

The processing circuitry may be to periodically encode the beam report for sending to the gNB in accordance with a reporting period, where the reporting period may be specified by the gNB. The processing circuitry may be to apply a sliding window for averaging when the reporting period is less than a beam measurement period needed for averaging. The processing circuitry may be to encode the beam report for sending to the gNB in response to downlink control information (DCI) received from the gNB over a physical downlink control channel (PDCCH). The processing circuitry may be to average a number N RSRPs for the beam report, where the number N is received from the gNB. The processing circuitry may be to average a plurality of RSRPs for the beam report from a CSI-RS received in different slots.

In Example 2, an apparatus for a next generation evolved Node B (gNB), the apparatus comprises: memory and processing circuitry, wherein, the processing circuitry is to encode instructions for sending to a user equipment (UE) that instruct the UE to: measure reference signal received power (RSRP) of one or more channel state information reference signals (CSI-RSs), where the CSI-RSs are transmitted from the gNB via different directional beams; for a particular directional beam, average a plurality of RSRPs for the CSI-RS associated with that particular beam received at different times; and, encode a beam report for sending to the gNB that includes the average RSRP of one or more CSI-RSs associated with one or more beams. The processing circuitry may be to encode instructions that instruct the UE to periodically encode the beam report for sending to the gNB in accordance with a reporting period. The processing circuitry may be to encode instructions that instruct the UE to apply a sliding window for averaging when the reporting period is less than a beam measurement period needed for averaging. The processing circuitry may be to encode instructions that instruct the UE to encode the beam report for sending to the gNB in response to downlink control information (DCI) received from the gNB over a physical downlink control channel (PDCCH). The processing circuitry may be to encode instructions that instruct the UE to average a number N RSRPs for the beam report, where the number N is received from the gNB. The processing circuitry may be to encode instructions that instruct the UE to average a plurality of RSRPs for the beam report from a CSI-RS received in different slots.

In Example 3, a non-transitory computer-readable storage medium comprises instructions to cause processing circuitry of a UE or gNB, upon execution of the instructions by the processing circuitry, to perform any of the function recited in Examples 1 and 2.

The above detailed description refers to the accompanying drawings. The same reference numbers may be used in different drawings to identify the same or similar elements. In the above description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The embodiments as described above may be implemented in various hardware configurations that may include a processor for executing instructions that perform the techniques described. Such instructions may be contained in a machine-readable medium such as a suitable storage medium or a memory or other processor-executable medium.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

The invention claimed is:

1. An apparatus for a user equipment (UE), the apparatus comprising:
   memory and processing circuitry, wherein, the processing circuitry is to:
       measure reference signal received power (RSRP) of one or more channel state information reference signals (CSI-RSs), where the CSI-RSs are transmitted from a base station (BS) via different directional beams;
       for each of one or more beams, time average a plurality of RSRPs for the CSI-RS associated with that beam received at different time slots; and
       periodically encode a beam report for sending to the BS in accordance with a reporting period, wherein the beam report includes, for each of the one or more beams, the corresponding time averaged RSRP of the corresponding CSI-RS, wherein a sliding window is applied for averaging when the reporting period is less than a beam measurement period needed for averaging.

2. The apparatus of claim 1 wherein the processing circuitry is to encode the beam report for sending to the BS in response to downlink control information (DCI) received from the BS over a physical downlink control channel (PDCCH).

3. The apparatus of claim 1 wherein the processing circuitry is to average a number N RSRPs for the beam report, where the number N is received from the BS.

4. The apparatus of claim 1 wherein the processing circuitry is to average a plurality of RSRPs for the beam report from a CSI-RS received in different slots.

5. The apparatus of claim 1, further comprising:
   antennas; and
   a transceiver coupled to the antennas and to the processing circuitry.

6. The apparatus of claim 1, wherein the base station is a gNodeB of 3GPP 5G New Radio.

7. A non-transitory computer-readable storage medium comprising instructions to cause processing circuitry of a user equipment (UE), upon execution of the instructions by the processing circuitry, to:
   measure reference signal received power (RSRP) of one or more channel state information reference signals (CSI-RSs), where the CSI-RSs are transmitted from a base station (BS) via different directional beams;
   for each of one or more beams, time average a plurality of RSRPs for the CSI-RS associated with that beam received at different time slots; and,
   periodically encode a beam report for sending to the BS in accordance with a reporting period, wherein the beam report includes, for each of the one or more beams, the time averaged RSRP of the corresponding CSI-RS, wherein a sliding window is applied for averaging when the reporting period is less than a beam measurement period needed for averaging.

8. The non-transitory computer-readable storage medium of claim 7 further comprising instructions to encode the beam report for sending to the BS in response to downlink control information (DCI) received from the BS over a physical downlink control channel (PDCCH).

9. The non-transitory computer-readable storage medium of claim 7 further comprising instructions to average a number N RSRPs for the beam report, where the number N is received from the BS.

10. The non-transitory computer-readable storage medium of claim 7 further comprising instructions to average a plurality of RSRPs for the beam report from a CSI-RS received in different slots.

11. An apparatus for a base station (BS), the apparatus comprising:
    memory and processing circuitry, wherein, the processing circuitry is to encode instructions for sending to a user equipment (UE) that instruct the UE to:
        measure reference signal received power (RSRP) of one or more channel state information reference signals (CSI-RSs), where the CSI-RSs are transmitted from the BS via different directional beams;

for each of one or more beams, time average a plurality of RSRPs for the CSI-RS associated with that beam received at different time slots; and, periodically encode a beam report for sending to the BS in accordance with a reporting period, wherein the beam report includes, for each of the one or more beams, the corresponding time averaged RSRP of the corresponding CSI-RS, wherein a sliding window is applied for averaging when the reporting period is less than a beam measurement period needed for averaging.

12. The apparatus of claim 11 wherein the processing circuitry is to encode instructions that instruct the UE to encode the beam report for sending to the BS in response to downlink control information (DCI) received from the BS over a physical downlink control channel (PDCCH).

13. The apparatus of claim 11 wherein the processing circuitry is to encode instructions that instruct the UE to average a number N RSRPs for the beam report, where the number N is received from the BS.

14. The apparatus of claim 11 wherein the processing circuitry is to encode instructions that instruct the UE to average a plurality of RSRPs for the beam report from a CSI-RS received in different slots.

* * * * *